Figure 13:
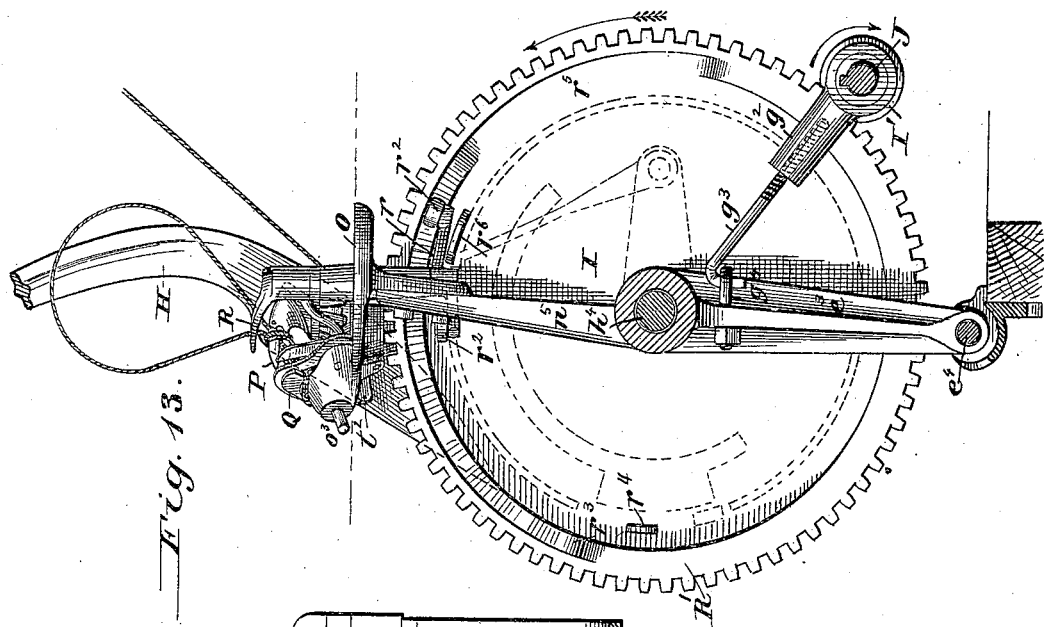

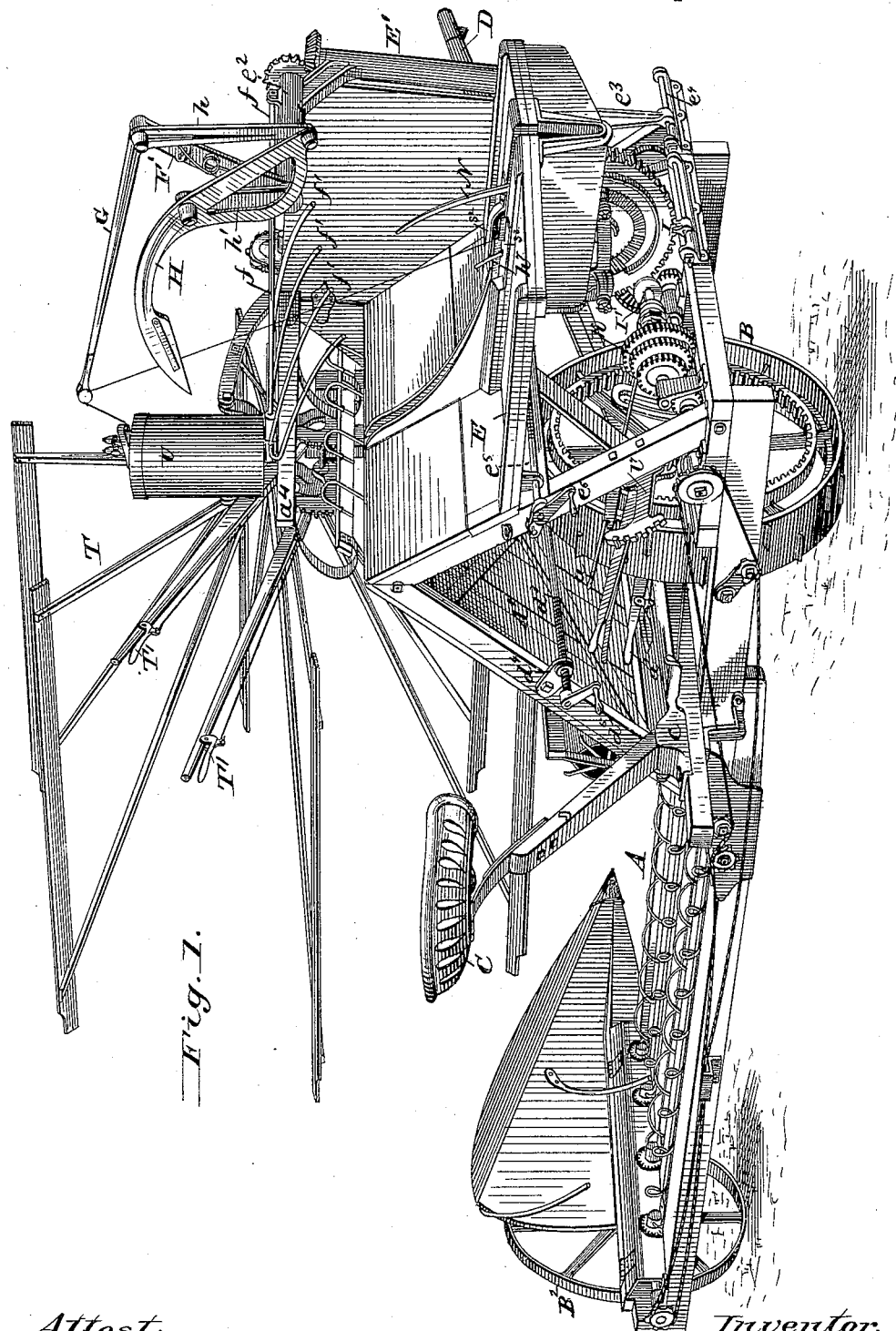

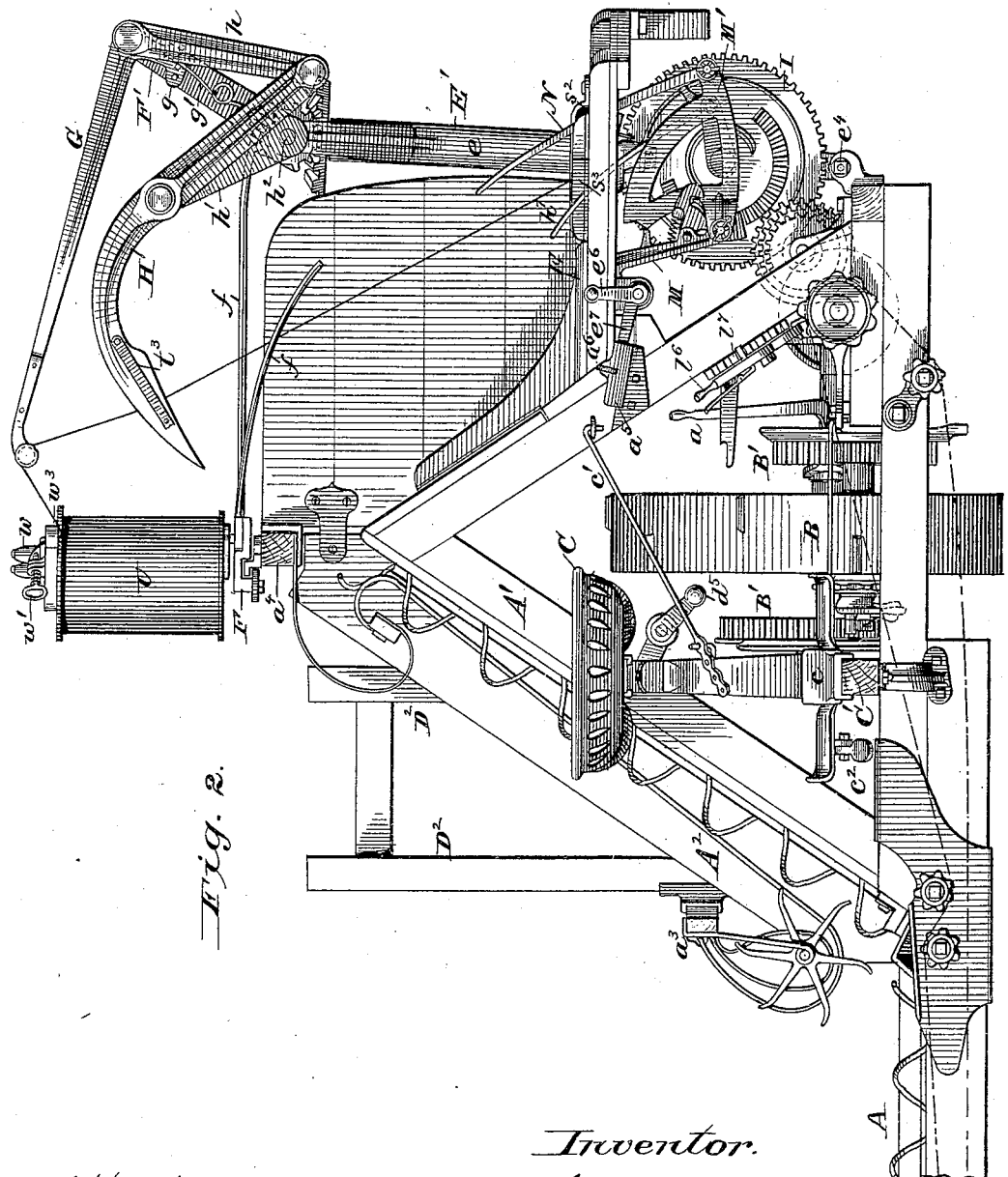

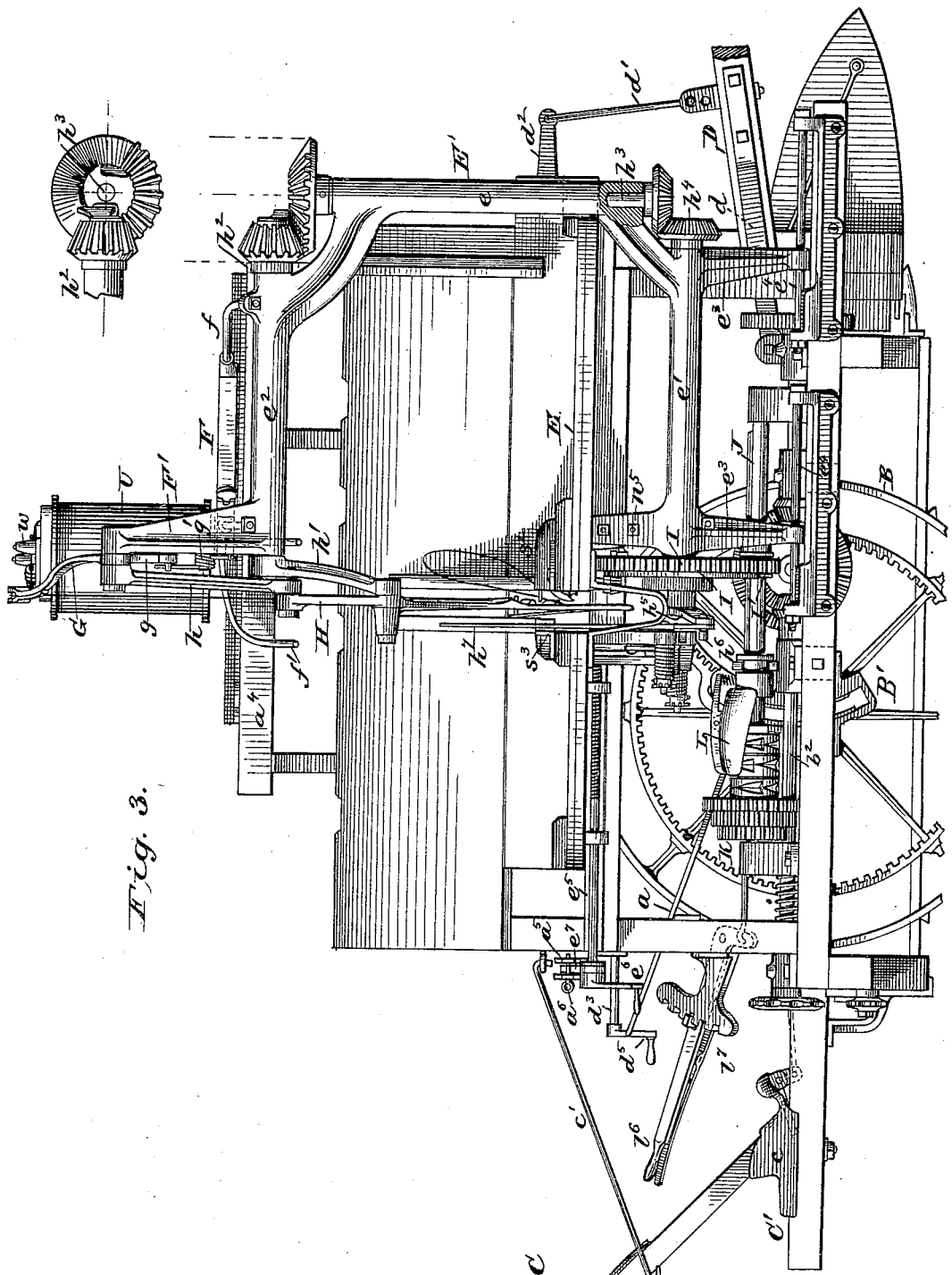

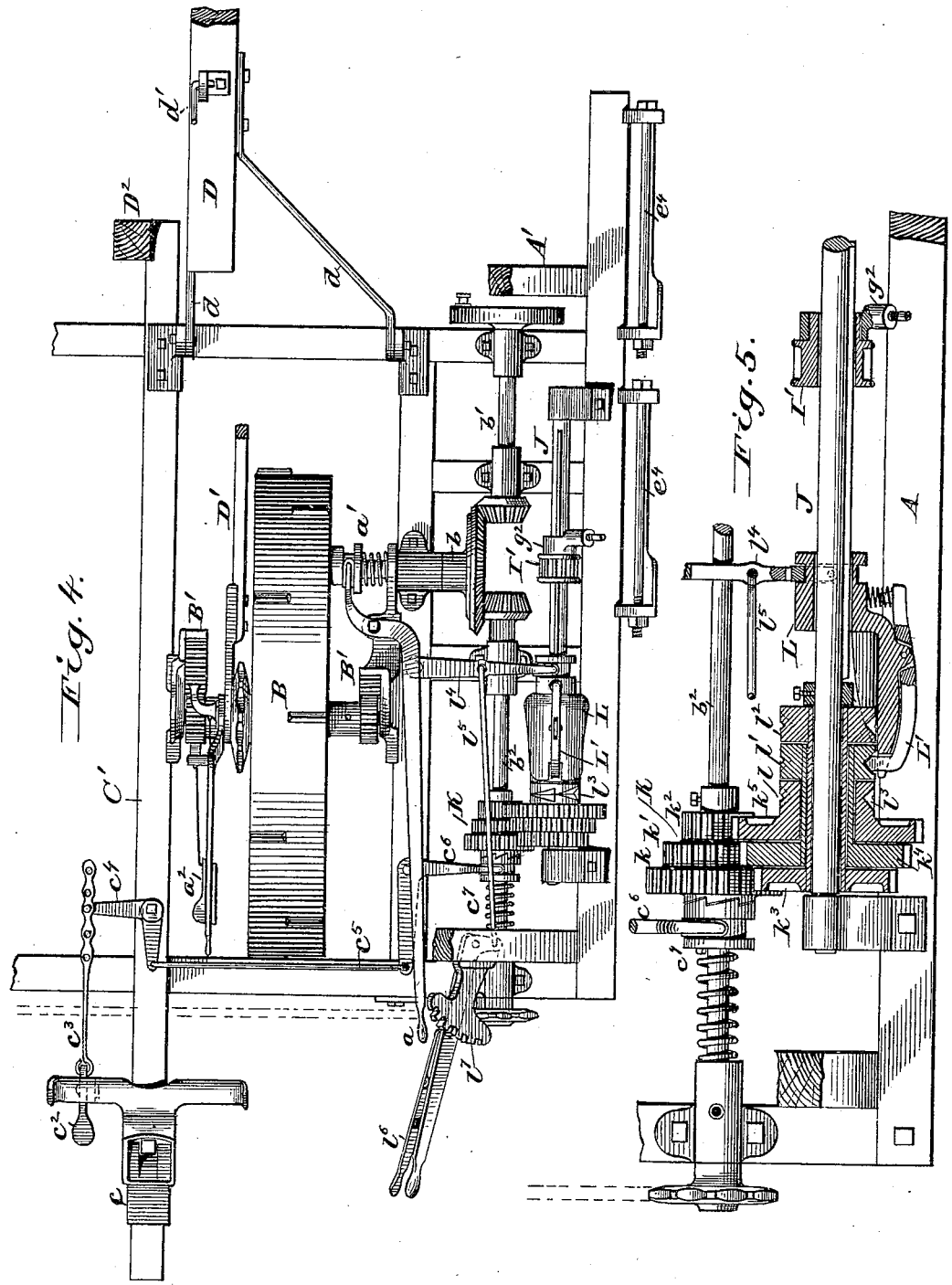

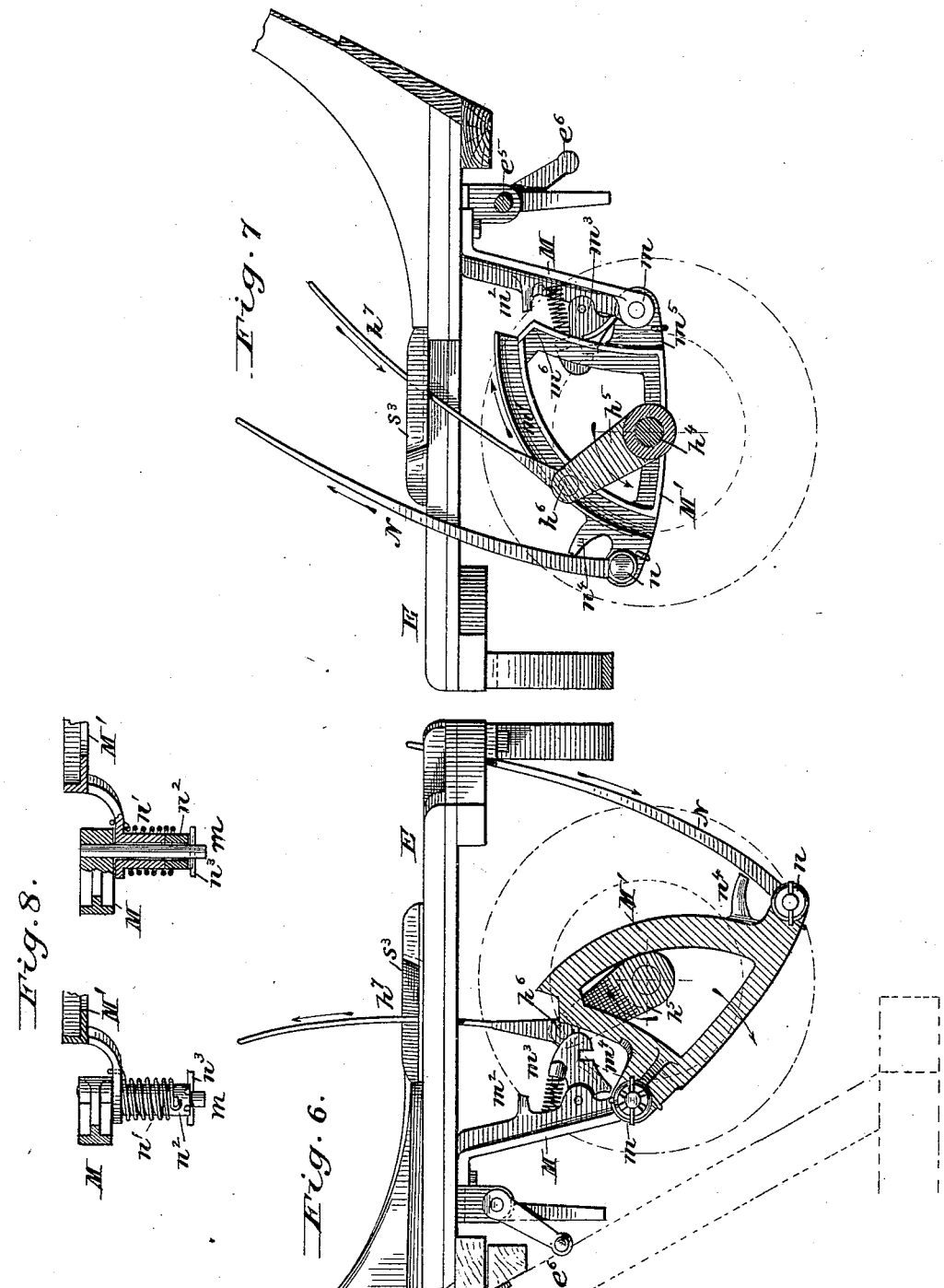

(Model.)

S. D. LOCKE.
GRAIN HARVESTER AND BINDER.

No. 389,848. Patented Sept. 18, 1888.

Attest:
H. R. Pennie
Danl. Kelly.

Inventor.
Sylvanus D. Locke
By Romeison & Romeison
Attorneys (Model.) 10 Sheets—Sheet 7.
S. D. LOCKE.
GRAIN HARVESTER AND BINDER.
No. 389,848. Patented Sept. 18, 1888.
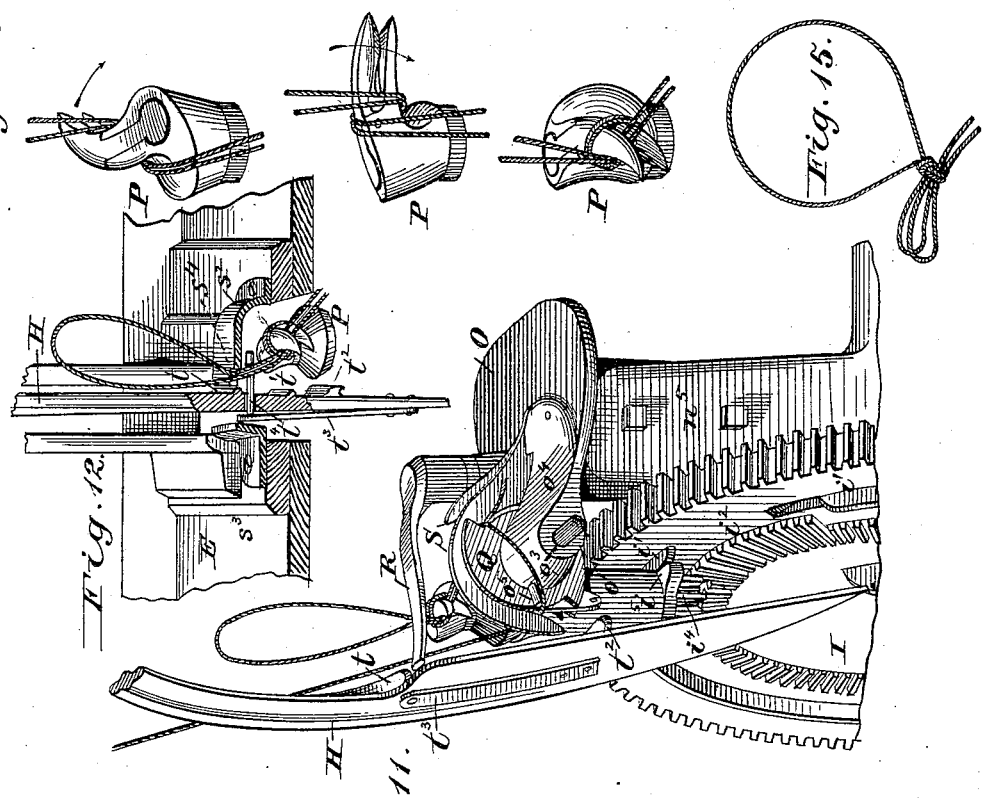
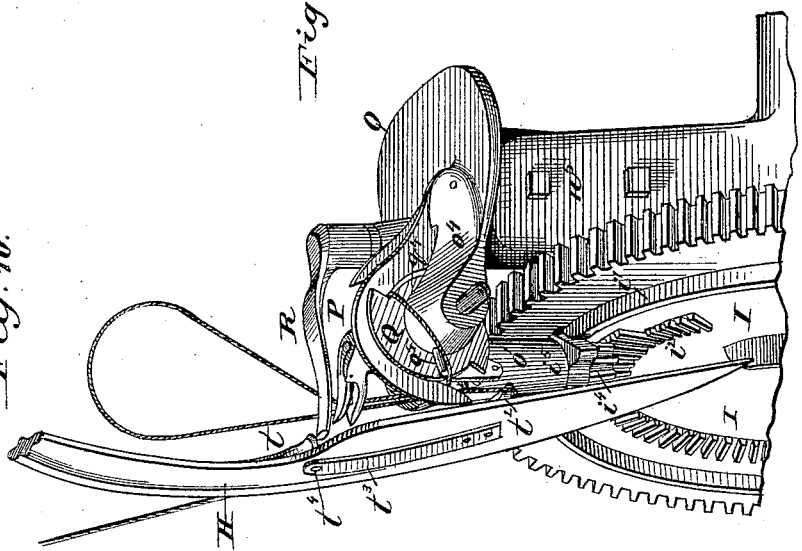
Attest:
H. L. Perrie.
Dan'l Kelly.
Inventor.
Sylvanus D. Locke
By Perkinson & Perkinson
Attorneys

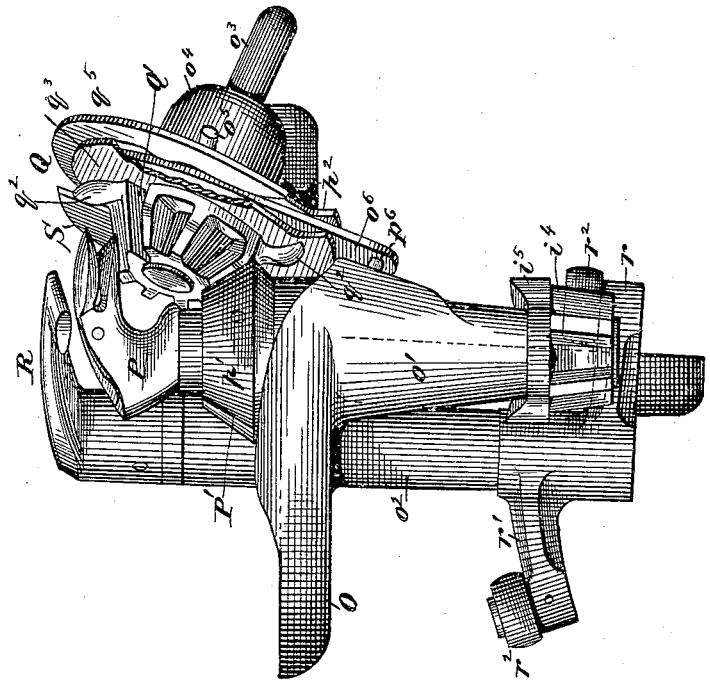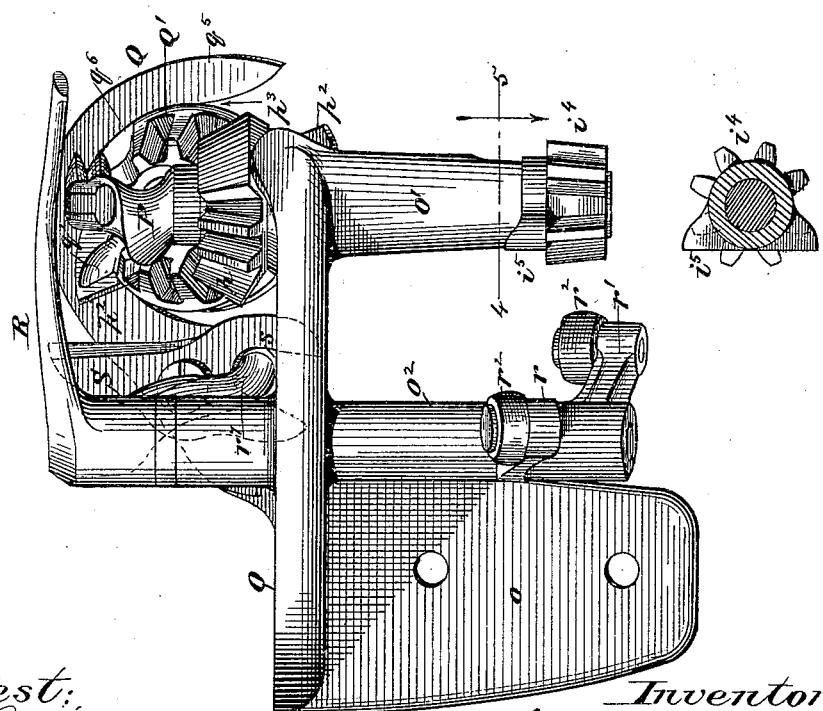

(Model.) 10 Sheets—Sheet 9.

S. D. LOCKE.
GRAIN HARVESTER AND BINDER.

No. 389,848. Patented Sept. 18, 1888.

Attest:
H. L. Perrine
Dan'l Kelly.

Inventor.
Sylvanus D. Locke
By. Pancuison & Pancuison
Attorneys.

(Model.)
10 Sheets—Sheet 10.
S. D. LOCKE.
GRAIN HARVESTER AND BINDER.
No. 389,848. Patented Sept. 18, 1888.
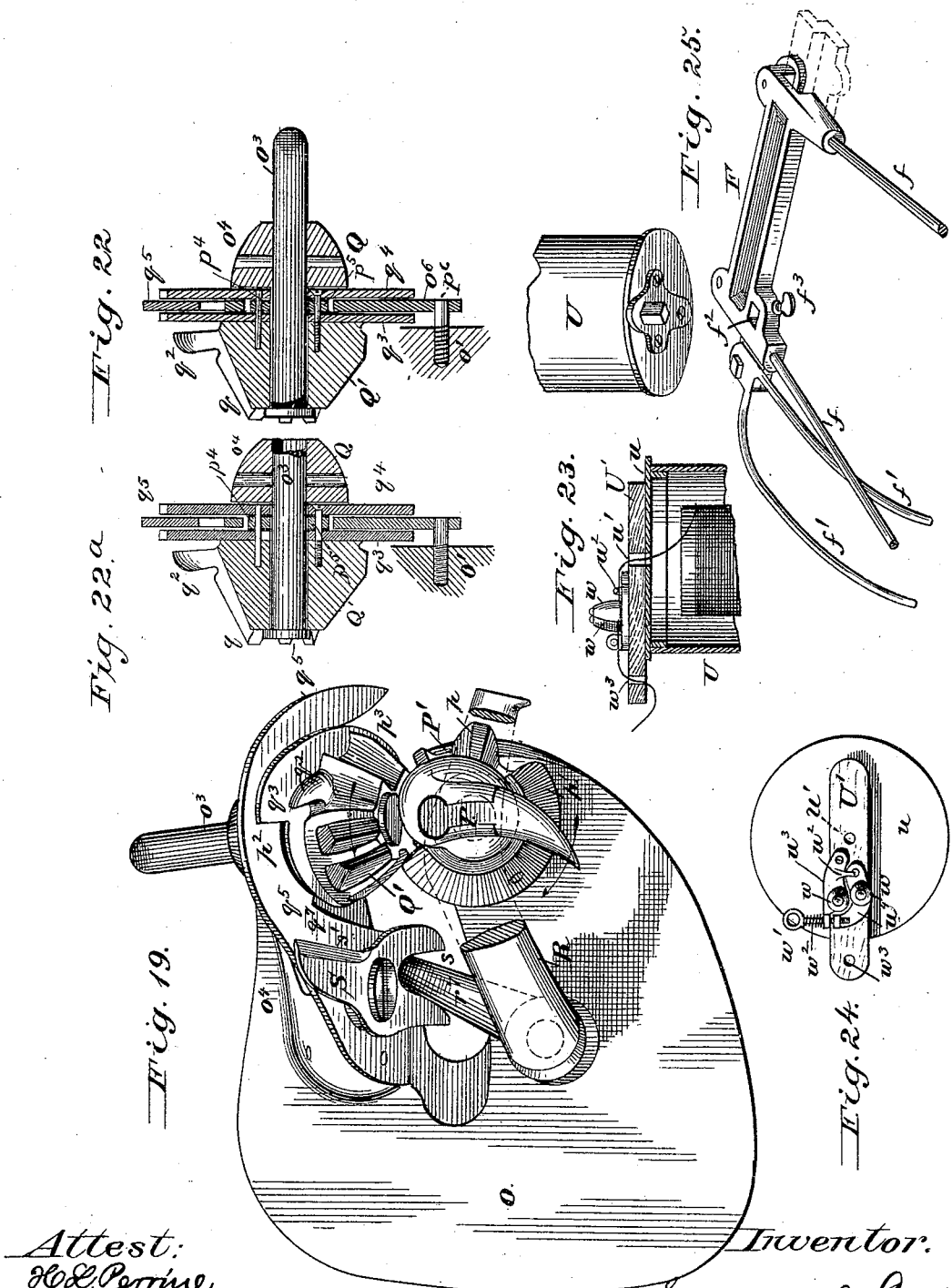
Attest:
H. L. Perrine
Danl. Kelly.
Inventor.
Sylvanus D. Locke
By Pennison & Pennison
Attorneys

UNITED STATES PATENT OFFICE.

SYLVANUS D. LOCKE, OF HOOSICK FALLS, NEW YORK.

GRAIN HARVESTER AND BINDER.

SPECIFICATION forming part of Letters Patent No. 389,848, dated September 18, 1888.

Application filed March 29, 1881. Serial No. 29,452. (Model.)

*To all whom it may concern:*

Be it known that I, SYLVANUS D. LOCKE, of Hoosick Falls, in the county of Rensselaer and State of New York, have invented certain new and useful Improvements in Grain Harvesters and Binders, of which the following is a specification.

My invention relates to automatic mechanism adapted to receive cut grain from a harvester, separate it into gavels, and bind it into sheaves, and to structural features in the harvester having relation to its use in connection with such or similar binding attachments; and it consists in the combination, with the binding-arm, of an outside compressor moving up from beneath the grain-receptacle to meet the gavel and controlled by a cam and accessory mechanism in a novel manner, so as to have a defined period of rest; in the combination, with the binding-arm, of an outside compressor moving up from beneath the grain receptacle or table to meet and stop the gavel and a divider-arm also moving up from beneath the table to make a clean separation of the gavel from the incoming stream; in the combination, with the binding-arm and band-securing devices, of an intermediate spring take-up adjustable as to the force with which it acts upon the band material; in the combination, with the binding-arm and band-securing devices, of a vibrating gate actuated to close in the path of the cord and stop it until the knot is formed and then open for the passage of the binding-arm or the action of a stripper; in the combination, with the binding-arm, of a finger adapted to ride over the crown of the knotter or tying-bill and strip or push the loop of the knot therefrom as the binding-arm passes; in an improved cord-holder; in an improved tension device; in the combination of an elevator-float or grain-guard overhung from one side of the harvester and a binding-arm overhung from the same side of the binding attachment, whereby a clear throat is left for projecting grain at one side of the machine; in the combination, with the overhung grain-guard and overhung binding-arm, of an overhung trackway on the harvester for the upper brace-rods of the binding attachment; in the combination, with an adjustable seat for the attendant, of an adjustable brace-rod whereby it is supported from the harvester-frame; in the combination, with an adjustable seat for the attendant, of a lever or treadle movable therewith and an adjustable link or rod whereby it is connected with the clutch mechanism which it controls; in novel means for making the connection between the harvester and the adjusting devices of the binder, and in the various other combinations and details of construction, hereinafter described and claimed.

Figure 9:
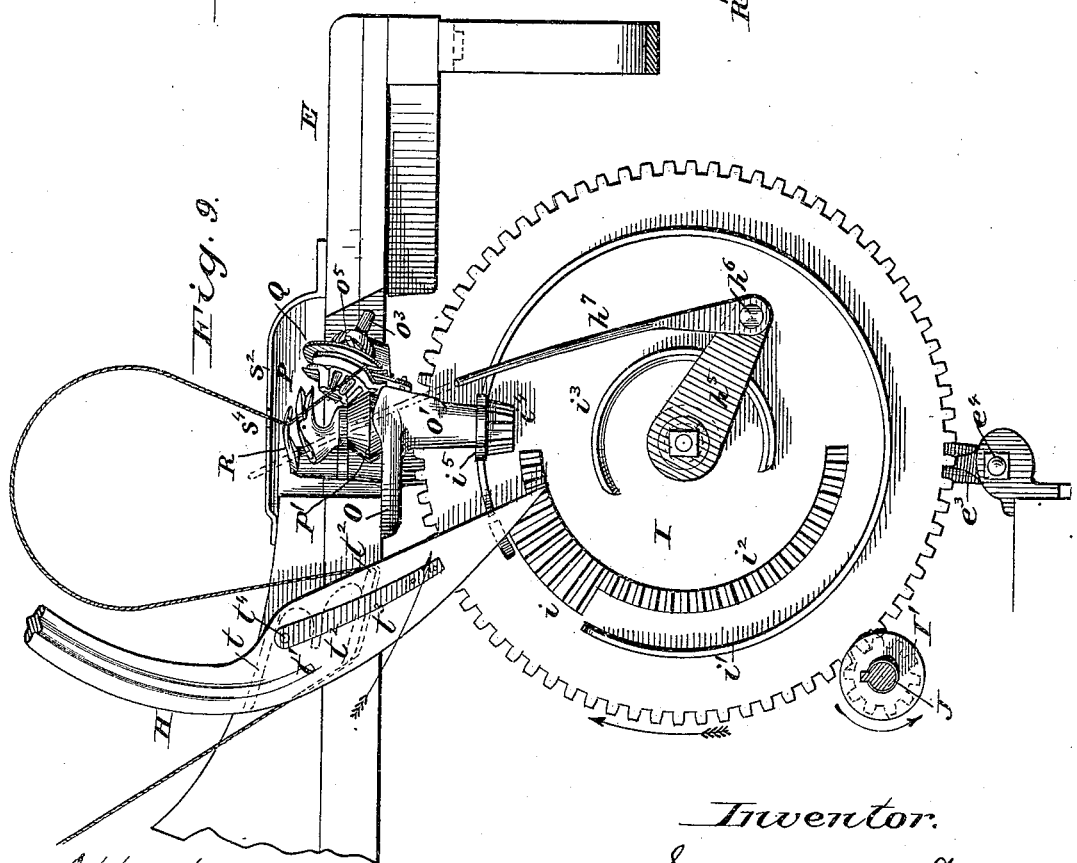
Figure 20:
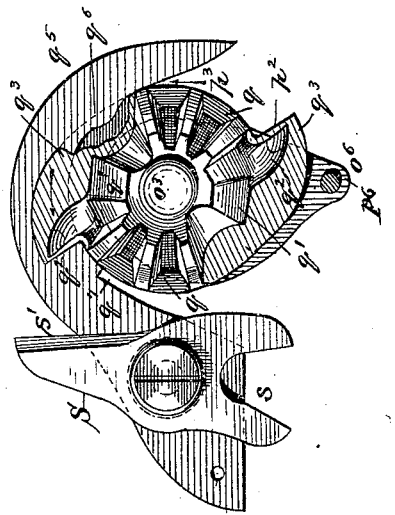
Figure 21:
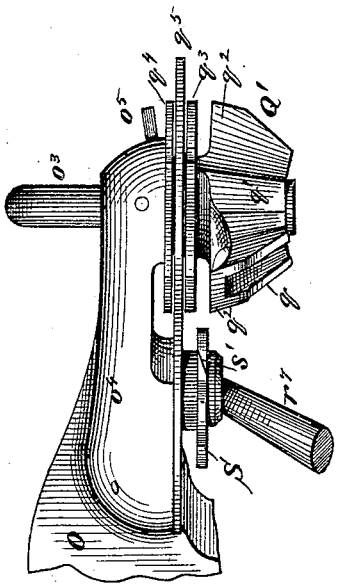
Figure 18:
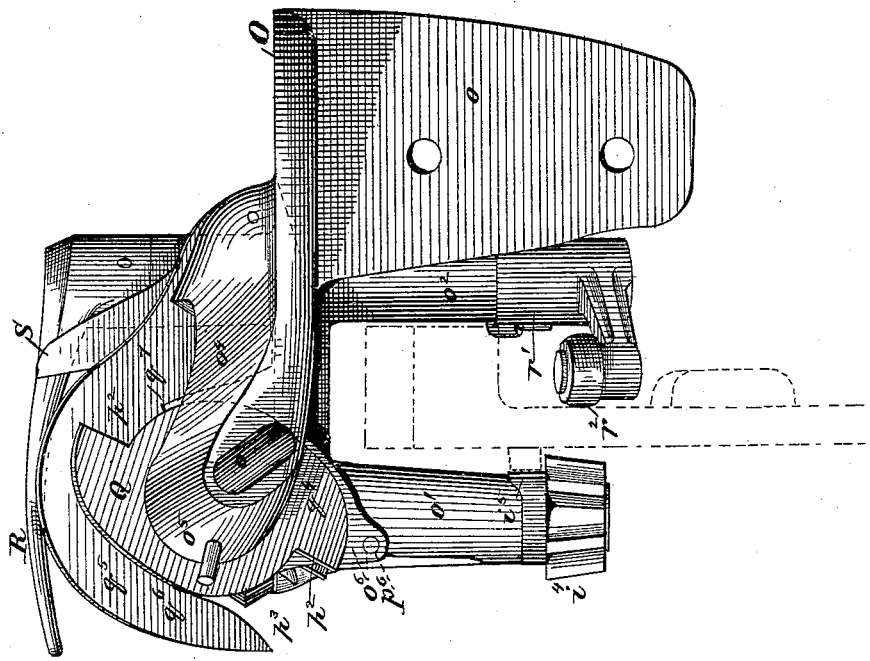

In the drawings, Figure 1 is a perspective view of a harvester and automatic binder embodying my improvements. Fig. 2 is a rear elevation thereof, a part only of the harvester-platform being shown. Fig. 3 is an elevation from the stubble side of the machine; Fig. 4, a top plan view of the ground-wheel and main gearing of the machine, the elevator and binding attachment being removed; Fig. 5, a plan view, partly in section, of the changeable speed-gear and mechanism by which it is controlled at will; Fig. 6, a rear and Fig. 7 a front side elevation of the grain-receptacle or binding-table and compressing and dividing arms working therethrough; Fig. 8, details of an adjustable spring-pivot for the compressing-arm; Fig. 9, a rear side elevation of the band-holding and band-securing mechanism in position to receive the second end of the cord from the binding-arm; Fig. 10, a perspective view of the same with the binding-arm so far advanced as to bring the spool end of the band within the range of action of the seizing and holding devices; Fig. 11, a like perspective view of the same after the cord has been taken from the binding-arm by the holding devices and the strands laid by the tying-bill in position to form a knot; Fig. 12, an outside detail view, partly in section, of binding-table, binding-arm, and knotter to show the action of the stripper carried by said arm; Fig. 13, a front side elevation of the band-securing devices at the same stage of action as in the eleventh figure; Fig. 14, details illustrating the operation of the tying-bill in forming a knot in the ends of the band; Fig. 15, the band complete; Fig. 16, an elevation from the inner side of the machine of the knotting, holding, and cutting devices and the movable gate which stops the cord, with the gear and cam wheel by which they are driven removed;

Fig. 17, a view of the same from the rear, and Fig. 18 from the outer or stubble side of the machine; Fig. 19, a top plan view of the same and the bracket in which they are mounted, the movable gate being broken away to show the crown of the tying-bill; Fig. 20, an elevation, and Fig. 21 a plan, of the cord holding and cutting mechanism; Fig. 22, a section through the holding-head; Fig. 22$^a$, a similar section of said holding-head to show the use of thin spacing-disks; Figs. 23 and 24, the cord-box and tension, and Fig. 25 a detail of the brace-rods and socket for the support of the cord-box or spool stand.

A represents the platorm upon which the grain falls as it is severed by the cutters and along which it is carried sidewise by suitable raking mechanism—such as the endless apron commonly used, or the series of spiral conveyors shown—and A' is the elevator-frame, also provided with raking mechanism to lift the grain and deliver it over its head to the binding-table.

Beneath the elevator-frame is the main supporting and driving wheel B, mounted in segment-standards B', and at the outer end of the platform is a grain-wheel, B$^2$, these two wheels constituting the carriers of the machine.

C is the seat, mounted behind the elevator-frame upon a rearwardly-projecting sill or timber, C', and D is the tongue, hinged beneath the elevator to the timbers of the draft or wheel frame.

For the purpose of varying the height of cut and for transportation the machine is vertically adjustable upon the axle of the main or driving wheel, as is usual in machines of this class, the grain-wheel being likewise adjustable in order to maintain the platform in a horizontal position.

The adjusting mechanism which I prefer to use upon the main-wheel axle is substantially that covered in Letters Patent granted to me January 11, 1881, and numbered 236,503, in which the axle is furnished with pinions meshing into segmental racks upon its supporting-standards, and with a lever having suitable dogs or detents and mounted in such relation that it may cause or control the rotation of the pinions or lock them against movement, as will be more perfectly understood by reference to said Letters Patent.

I have found it desirable to place the seat lower down than has heretofore been customary, and in such position that the driver may see the binding-table as well as the grain-platform, and that his line of sight may strike the standing grain before the cutters at a very moderate inclination. For this purpose, and in order also to permit the various levers and other devices by which the different groups of mechanism are controlled or adjusted to be brought directly and conveniently within reach of the driver, I mount the seat C, as already stated, upon the rearwardly-projecting or lengthened end of a sill or beam, C', which runs longitudinally beneath the elevator-frame, the standard of said seat being seated in a casting, c, which is or may be adjustable forward and backward upon the beam. Thus located the seat is convenient to reach, and the driver seated therein commands a view of the raking-platform and the binding-table on opposite sides of the elevator and a low-down view of the standing grain, besides being in convenient position to reach the lever for raising and lowering the machine, the devices for adjusting the tongue and binding-table, and the levers for controlling the position of the reel and throwing the various groups of mechanism in and out of gear, as will be hereinafter explained.

The step or casting c is formed with an inclined socket to receive the seat-standard and with a foot-rest to receive the feet of the driver. The standard may be bolted in the socket; but ordinarily its leverage will be sufficient to confine it therein, and for the purpose of staying it when so confined and to permit its ready removal or adjustment I provide a rod, c', having its inner end bent to hook into an eye or staple on the frame of the machine, and having a series of perforations at its outer end to receive a hook or pin on the seat-standard and allow of the adjustment of the seat, said hook being bent at such angle that after the rod has been applied thereto and hooked into its eye on the frame it cannot be removed without first releasing it from said eye.

As the adjustment of the machine bodily upon the axle tends to change the relation of the draft-tongue to the team, and as it is frequently desirable to change the angle of the cutters to the ground or to raise or lower them by rocking the harvester upon the carrying-wheels, it is customary to provide means whereby the tongue may be moved positively upon its hinge, thus causing the front of the harvester to sink or rise, as the case may be, as the tongue conforms itself to the draft. In the present instance, the hounds d of the tongue being hinged or jointed beneath the elevator-frame to the front portion of the two side beams of the wheel-frame, as usual, I connect it at a suitable distance from said joint by a link, d', to one arm of an elbow-lever, d$^2$, pivoted to the outer reel-post, D$^2$, or to the inner front strut of the elevator-frame, and the other arm of this lever I connect by a ball-and-socket or equivalent joint with the forward end of a rod or shaft, d$^3$, running longitudinally backward beneath the elevator, and at its rear end threaded through an arm or casting, d$^4$, fast to the inner rear strut and provided, within reach of the driver in his seat, with a crank or hand wheel, d$^5$, by which it may be turned. The rotation of the rod or shaft causes it to move forward or backward, thereby rocking the elbow-lever upon its pivot and elevating or depressing the tongue. Other means than these may, however, be used, the controlling handle or lever being brought to the rear of the machine, as above.

The binding-table or receptacle E is supported upon the outer struts of the elevator-frame and upon a post frame or casting, E', comprising a front post, $e$, a subtending arm, $e'$, an overhanging arm, $e^2$, and feet $e^3$, sliding on rods or ways $e^4$, fast to the end beam of the main frame, as in machines heretofore patented by me. It is adjusted back and forth by means of a rod, $e^5$, running longitudinally beneath it in the angle formed by its junction with the elevator and threaded into a hanger depending from its under surface. At the rear end of this rod, within reach of the driver in his seat, is a crank or hand wheel, $e^6$, whereby it may be turned to adjust the binding-frame back and forth, its purchase upon the main frame for this purpose being obtained through an arm, $e^7$, projecting from the outer rear strut of the elevator-frame and confined between collars on the rod.

In harvesters of this class the binding-frame is generally made removable, either for storage or repairs or to substitute a different type or a hand binding attachment. I therefore make the connection of the adjusting rod or shaft $e^5$ with the elevator-frame a detachable one by bolting or otherwise securing a grooved block or socket, $a^5$, to the elevator-strut, into which socket the arm $e^7$ latches, and wherein it is secured by the insertion of a spring-key, $a^6$, or other keeper. When this key is withdrawn, the arm may at once be swung out of the socket, and, other connections having been cast off, the binding-frame is ready to be removed.

The overhung arm $e^2$ of the post-frame is connected by brace-rods $f$ with a block, F, which sits upon a way or track upon the bar $a^4$, overhanging the head of the elevator from the outer reel-post, D², as in Letters Patent No. 223,781, granted me October 26, 1880, and slides back and forth thereon as the binder-frame is adjusted, and from this block guards or deflectors $f'$ project downward toward the grain-receptacle to guide the grain passing beneath and keep it away from the binding-arm when the latter is in its elevated position.

A standard, F', projects upward nearly vertically from the end of the arm $e^2$ and bears at its top the pivot for the slack take-up G and for the radius-bar $h$, which controls the heel of the crank-driven binder-arm H. The slack take-up is a rigid bar free to move upon its pivot, except that it will be stopped, as customary, against rising beyond its effective position, having at its point an eye and anti-friction roll for the passage of the binding material and controlled at its heel by a spring. In order that it may be adjustable as to the force with which it resists the binding material, I provide this heel-extension $g$, which, to bring it conveniently alongside the standard F', is bent at about right angles to the body part with a row of pins, between any two of which the straight end of the spring $g'$, seated upon said standard, may be placed. Instead of a row of pins, however, the heel-piece may have a series of perforations, and the end of the spring, being formed with a bend or hook, may be caused to take into any one of said perforations, thus accomplishing the same purpose.

The crank $h'$, which drives the binder-arm, is fast to a shaft $h^2$, journaled in the overhanging bracket $e^2$, and gearing by mutilated bevel-gears, to stop the binder-arm during the action of the band-uniting devices, with another shaft, $h^3$, running through the vertical post $e$, and this in turn gears with a third shaft, $h^4$, journaled in the subtending arm $e'$ of the post-frame and driven by the gear and cam wheel I, which operates the band-uniting mechanism, thus insuring perfect harmony in the movements of the binder.

Beyond the gear and cam wheel the shaft $h^4$ is provided with a crank, $h^5$, which drives, by means of its wrist-pin $h^6$, a dividing or separating arm, $h^7$, substantially as in Letters Patent granted me on the 14th day of December, 1880, and numbered 235,443, to which reference may be made for a further description of its operation. As in said Letters Patent, too, I prefer to provide one face of the gear and cam wheel with a short rack, $i$, a long rack, $i^2$, and a cam, $i^3$, whereby the cutting, holding, and twisting devices therein described or any similar mechanism may be substituted for the knotter and its accessories shown herein. The short rack $i$, in conjunction with a delay-ledge, $i'$, serves also in the present organization to drive and control the knotting or tying bill, as will be in due time explained.

The gear and cam wheel meshes with and is driven by a sliding pinion, I', connected to the shaft J by a spline, so as to slide longitudinally thereon in the back and forth adjustments of the binder-frame. For additional security, to prevent the springing of the shaft and to more strongly brace the binder-frame, an arm, $g^2$, is sleeved upon the hub of the sliding pinion and receives a rod, $g^3$, which is hooked at its end, so as to take into an eye, $g^4$, upon the rear foot, $e^3$, of the post-frame. This rod is threaded into its socket in the arm $g^2$, so that it may be taken up or let out as needful to make a tight joint, and it can at any time be quickly unhooked from its eye to allow the removal of the binder-frame.

The main wheel B meshes, by means of an annular gear upon its side or rim, with a pinion upon a short shaft, $b$, which pinion may be rendered fast or loose, as desired, by means of a hand-lever, $a$, extending longitudinally beneath the elevator from a point convenient to the driver's seat at the rear to a sliding clutch-piece upon said shaft. At its outer end the shaft is provided with a bevel gear driving the counter-shafts, which carry at the front of the machine the crank-wheel for the cutter-pitman and at the rear the chain or master wheel of the raking apparatus. Heretofore it has been customary to drive these devices by a single counter-shaft extending the whole width of the machine and meshing by means of a single bevel-pinion with the prime shaft $b$. The relative speeds of cutting and raking mechanism are therefore determined by the size of the exposed wheels at either end of the shaft.

I have found it advisable and beneficial to divide the shaft into two sections, as above indicated, and provide each at its inner end with a bevel-gear meshing independently of the other with the single gear on the prime shaft. Under this arrangement the crank-shaft $b'$ may be driven with great speed by an outer rim of gear-teeth upon its master-wheel, as shown, while the shaft $b^2$, which carries at its rear end the rake sprocket-wheel, and also meshes along its length with the shaft J, and thereby operates the binder, may be geared with an inner or lesser rim on the same wheel and turned more slowly.

It is desirable to make the connection between the shaft $b^2$ and its counter-shaft J, which drives the gear and cam wheel of the binding attachment, such that the speed of the binder may be changed to accommodate it to the delivery of the harvester as the thickness of the crop varies. To this end I mount upon the shaft $b^2$ a change speed gear, K, consisting of two or more diminishing gear-wheels, $k$ $k'$ $k^2$, and cause them to mesh with corresponding enlarging gear-wheels, $k^3$ $k^4$ $k^5$, upon said counter-shaft. The wheels $k$ $k'$ $k^2$ are all rigidly secured to their shaft and may be formed in one piece or locked together. The wheels $k^3$ $k^4$ $k^5$ are capable of being separately locked to their shaft, so that while any one is driving it the others may run free.

In order to change the speed at will while the machine is in action, the wheel $k^3$ at the outer end of the series of independent gears is formed with a long sleeve-bearing taking over the cylindrical surface of the shaft J and terminating in an enlarged hub, $l^2$. The wheel $k^4$ is in like manner sleeved upon the foregoing sleeve and provided with a hub, $l'$, and the final wheel, $k^5$, with its hub $l$, is exterior to and concentric with the sleeves of the other wheels, the outer surfaces or peripheries of the hubs being flush with each other.

A series of notches, $l^3$, are formed in the hubs of such shape as to present at the rear end, or that away from which the wheels are driven, an abrupt or vertical shoulder, and at the sides and opposite end to reach the surface by a gentle inclination or bevel.

A block, L, is mounted upon the shaft J and slides along its spline, and upon this block is carried a spring-dog, L', the point of which is beveled to match the shape of the recesses $l^3$ in the hubs, so that when set into any one of said recesses it may lock against the shoulder thereof and be driven before it with its bearing-block and shaft. The block L is formed, as shown, with a projecting arm, which may be semi-cylindrical, or entirely cylindrical, if so desired, to afford protection to the gearing. The dog is pivoted to the exterior of this arm, and its point takes through a slot or perforation therein to reach the recessed hubs and is stopped by the contact of the body part with the surface of the arm from falling at any time below its effective position, so as to interfere with the gearing. A lever, $l^4$, is yoked to the sleeve portion or hub of the block and connected by a link, $l^5$, with a hand-lever, $l^6$, behind the elevator and within reach of the driver's seat, so that the block may at any time be moved in or out relatively to the series of gear-hubs, and a segment, $l^7$, on the frame receives a detent from said lever to lock the block in any desired position.

The segment into which the detent of the hand-lever $l^6$ engages has a series of retaining holes or recesses, numbering one less than double the number of the gear-hubs—that is, for the three hubs herein described there are five recesses, the two outer and the central one corresponding with the hubs and the intermediate ones stopping the lever in position to hold the dog midway between the notches of adjoining hubs. Under this arrangement, when the lever is set, as in Fig. 4, into the central recess in the segment, the dog will engage with a notch in the central gear-hub, and that hub will drive the shaft. When the lever is released and moved along the segment, the dog will be caused to ride up out of the notch by the contact of its beveled point with the beveled side walls of the notch until it reaches the plane surface formed by the uncut adjacent peripheries of the hub it is leaving and the succeeding hub, where, if desired, it may be stopped and held by setting the detent of the hand-lever in the corresponding segment-recess, which will be the recess intervening between the central and one of the outer ones. In this position all the gears will be loose on the shaft and the binder will not be operated; but if the lever is carried on and locked into one of the outer segment-recesses the dog will be brought into engagement with one of the notches in an end hub, and the binder will be driven at a speed greater or less, as the case may be, than before.

As above stated, the notches in the hubs reach the surface at one end by a gentle bevel or incline, the purpose of this being to permit the dog to pass out of engagement in case the rotation of the gears should be reversed by accident or from any other cause.

In order that the speed-gears may at any time be quickly and entirely thrown out of action, either for an emergency, as when grain is sparse and it is necessary to size it independently, or to keep them from unnecessary wear, I prefer to fasten the prime gear K upon its shaft by means of a clutch controllable at will, and advisably a one-way clutch, and therefore pivot to the foot-rest of the block $c$ a pedal, $c^2$, which, by means of a link, $c^3$, adjustable to compensate for the adjustments of the seat, is connected with an elbow-lever, $c^4$, and the latter in turn connects through a link, $c^5$, with a cranked lever, $c^6$, which yokes upon the sliding half of the clutch and presses it back against its spring when the pedal is depressed. The adjustability of the link $c^3$ may be easily secured by forming it with a series of perforations in the end adjacent to the lever which it moves and providing the end of this lever with a hook or pin, over which any one of these perforations may take, the perforations of course being spaced with reference to those in the seat brace-rod hereinbefore described.

As a rule, a better sheaf is formed when the gavel is compressed on all sides by means independent of the band and to some extent positive. This involves in all practicable constructions, besides the binding-arm, an opposing compressing-arm generally acting from the outer side of the grain-table, and in most instances overhung.

In order to obtain the advantage of an arm acting from below the grain-table and held therebeneath for an appreciable interval while the sheaf is being ejected, while capable of rising quickly immediately after the discharge to intercept the next gavel and remaining up during the ensuing compressing and binding operation, I have adopted means substantially such as shown in Figs. 6 and 7 of the drawings.

A bracket or hanger, M, depends beneath the inner side of the binding-table, and to this is jointed by a pivot, $m$, a cam-piece, M', bearing at its outer ends by means of a pivotal pin, $n$, the compressing-arm N. The latter, if it is not intended to be yielding, may play through a guideway or eye in the grain-table; but it is preferable to have it capable of elastically yielding, and I therefore cause it to play through the usual slot in the table, and apply to its pivot-pin a coiled spring, the stress of which is or may be adjustable, and which tends constantly to hold it in toward the receiving side of said table.

The wrist-pin $h^6$ of the crank $h^5$ is elongated, so that as it revolves it may take into a cam-track, $m'$, of the piece or casting M', and thereby cause the intermittent rise of the compressor-arm. This cam-track may be prolonged or made continuous, so that the wrist-pin may control as well the movements and the periods of rest of the compressor; or it may be of such shape and length only as to control the rise and upward stay, while permitting the device to fall at the proper time by its own weight. In the arrangement shown the first part of the rise is made quick and sharp by the action of a spring, $n'$, coiled about the pivot-pin $m$ of the cam-piece, while immediately after this initial movement the motion becomes positive by the engagement of the wrist-pin in the curved upper track of the camway, and the fall is induced by the action of the wrist-pin upon a vertical part, $m^6$, of the track at a later period in its revolution. As the cam-piece is raised, it pushes up a spring-latch, $m^3$, pivoted on the hanger M, and at the moment it reaches its full height and the wrist-pin is about leaving the curved track this latch drops over a flange, $m^4$, on said casting, and thereby locks it in position. A stop or abutment, $m^2$, is formed upon the hanger to stop the casting against accidentally overpassing the point at which the latch will engage with the flange. After the wrist-pin leaves the curved trackway it does not further operate the cam-piece until it enters the vertical way $m^5$, and the piece is therefore held stationary for a considerable interval, during which the grain is packed against the compressing-arm and the ends of the band united. Immediately after the wrist-pin enters said vertical way, however, it strikes a curved rib or ledge on the latch $m^3$ and lifts the latter to disengage it from the flange, and then, continuing on, bears against the track at the point $m^6$ and forces the cam-piece down, so as to retract the compressing-arm and allow the sheaf to be ejected.

I make the stress of the spring $n'$ about the pivot-pin $m$ adjustable by the following means: The bearing of the cam-piece M' on said pin is for steadiness prolonged into a hub, and the spring is attached at one end to the body part of this piece and coiled about the hub. At the outer end of the pin I mount a short sleeve, $m^2$, to which the corresponding end of the spring is fastened. This tube has radial perforations or external grooves matching with a hole through the pin, so that by inserting a key, $n^3$, the sleeve may be locked in any desired peripheral adjustment. The tension of the spring on the pivot of the compressing-arm may be similarly controlled.

Were the compressing-arm entirely free to revolve around its pivot it would tend to close in under the stress of the spring past its range of action. It is therefore stopped at a proper point by coming in contact with a shoulder or projection, $n^4$, on the cam-piece, while left free to yield away therefrom to any desired extent.

The compressing-arm and the dividing or separating arm, it will be observed, are in this instance both controlled and operated by the single wrist-pin or the crank $h^5$, and are so timed and move in such relation to each other that the latter has nearly completed its rise alongside the binding-arm as the former is caused to fall, and when the compressing-arm again begins to ascend the dividing-arm is at the point of commencing its descent. The compressing-arm may, however, be used without the dividing-arm, or with one of a different form, and when used together their relative motion may be slightly varied from that described, or they may be actuated by independent prime motors.

A short post or standard, $n^5$, rises vertically from the rear end of the subtending arm $e'$ of the binder-frame in close proximity to the face of the gear and cam wheel, and to this is bolted or otherwise firmly secured the depending flange $o$ of a bracket or casting, O, which overhangs said cam-wheel and supports or carries the band-securing mechanism. This bracket in the present case is supplied with a complete set of cord holding, uniting, and cutting devices, and is made removable from its supporting-post, so as to be replaced by a substantially similar bracket, provided, however, with mechanism for holding, cutting, and uniting the ends of a wire band to be driven, for convenience and economy of parts, as heretofore explained, by the same gear and cam wheel which drives the knotting devices herein, so that by unbolting and lifting off the single bracket or casting and substituting the other, the machine may be changed at once from a cord to a wire binder and retain in either case the same main gearing.

A bearing, $o'$, depends from the bracket alongside the rear face of the gear and cam wheel, and in this is mounted the shaft of the knotter or tying-bill P. Another bearing, $o^2$, depends upon the other side of the gear and cam wheel to receive the spindle of a gate, R, which, or some equivalent thereof, is an essential element when the knotter stops with its jaws pointing outwardly in the direction of the extended slot through the covering shield or deck, and the inclined stud or spindle $o^3$ of the holder Q is carried in a third bearing, $o^4$, offset laterally from the bracket.

So far as the bodily removal of the bracket and holding devices or the action of other elements of the binder is concerned, it is evident that the knotter and holder may be of any approved construction. The knotter herein is, however, a regular tying-bill, such as heretofore patented by me.

At the foot or lower end of the knotter-spindle is a fast pinion, $i^4$, which meshes with the short rack $i$ on the rear face of the gear and cam wheel, so as to give the knotter one revolution for each revolution of the wheel, and a delay-shoe, $i^5$, which, when the pinion passes out of mesh, rides upon the flange $i'$ on said wheel and holds the knotter in the position indicated in Fig. 9, with its jaws projecting outward and substantially parallel with the slot in the binding-table in readiness for the next knotting operation.

Immediately beneath the knotter-head, and also fast to its spindle, is a bevel-gear, P', having a series of teeth, $p$, and a blank or delay surface, $p'$, and this gear meshes with and drives a bevel-pinion, Q', on the stud or axle of the holder Q, said pinion having teeth $q$, with which the teeth of the gear P' intermesh, and recesses or cut-away portions $q'$, which slide upon the blank portion of the gear, so that the holder is operated directly from the knotter, moving once during each rotation thereof, and being locked out of action except at the proper period in said rotation. By this means I obtain perfect harmony between the motions of the knotter and of the holder, and avoid all danger of the action of one relatively overstepping or falling behind that of the other.

The holder Q consists, in general terms, of two parallel clamping-disks, $q^3$ $q^4$, fast to each other and to the pinion Q', shaped alike, and each having two or more shoulders, $p^2$, abreast of the shoulders on the other, a curved pressing-plate, which I term the "holder-plate," $q^5$, overhanging from the bracket-support and taking into the space between the disks, and a stripping-plate, $o^6$, also between said disks, with its periphery eccentric to their axis.

A steady-pin, $p^4$, projects from the base of the pinion Q', and both disks are perforated to match it, and also to match the axial hole or bearing of the pinion. The disk $q^3$ is first laid over this steady-pin and against the plane base of the pinion. A washer, $p^5$, likewise perforated to receive the pin, and of thickness slightly greater than the holder-plate, is laid upon the disk. Then the stripper $o^6$ is put in place, and finally the disk $q^4$ is laid over the washer and stripper and the whole bound together by screws passing through both disks and the interposed washer, the steady-pin enabling the parts to be readily positioned for the insertion of the screws. The head thus formed is now placed upon the stud, the shank of the stripper-plate caused to engage with a pin, $p^6$, projecting from the bracket, and a cap placed upon the stud to retain them thereon, or the latter, if formed with a solid cap, being pinned or otherwise secured in a fixed position. This construction enables me either at the outset or at any time when it may prove necessary or desirable to readily adjust the distance between the disks, so that they may clamp the cord with proper force against the edge and sides of the holder-plate by the insertion or addition of thin washers of paper or any other suitable material as re-enforcements to the washer or collar $p^5$. Practically such adjustment need be made only at the outset, as the disks will spring sufficiently to accommodate themselves to all average variations in the size of cord, or without springing will indent it sufficiently to carry it through the holder.

The disks $q^3$ and $q^4$ are described for some distance from the bases of their shoulders $p^2$ upon an arc concentric with their axis, and then rise eccentrically to form the succeeding shoulder. The holder-plate at its point projects downwardly and outwardly into and beyond the path through which the cord is carried by the binding-arm, so as to form, in conjunction with the clamping-disks, a converging throatway, $p^3$, into which the arm lays the cord as it passes. Above this throatway the inner edge of the holder-plate is in the main concentric with the axis of the clamping-disks, but slightly below their concentric peripheral portions. In order, however, to check the first or old strand of cord around the gavel, belayed ever since the previous binding operation beneath the holder from the point at which its end is clamped so as to lie in the throatway and wedged therein between the converging edge of the holder-plate and the smooth periphery of the disks, from passing prematurely too far up said throatway and becoming entirely fast therein, or from being carried on by frictional contact in advance of the second strand just brought down when the disks are started, I form at a slight distance beyond the throatway an embossment, $q^6$, by which this strand will be retarded until the other is brought up against it by the positive action of the shoulders, when both will be carried on together. Beyond this embossment, at a point about diametrically opposite the throatway, there is a recession, $q^7$, in the plate, the object of which is to release the old end of the cord as it is brought thereto by the clamping-plates at the moment that, or just after, they gather the strands from the throatway into the grasp of the holder.

Located upon the holder-pinion Q' a little in rear of the shoulders on the clamping-disks, and so as to leave a space between themselves and the face of the contiguous disks, are fingers, projections, or secondary shoulders $q^2$, the object of which is to afford a support to the strands of cord stretched between the holder and the knotter, and also in some degree to assist in presenting them properly for the action of the knife by which they are severed after the knot has been tied. This knife S, having an edge, $s'$, is pivoted to the flange or offset $o^4$ on the supporting-bracket, and is so arranged and operated that at the proper moment it descends upon the cord in the space between the finger $q^2$ and shoulder $p^2$ and cuts it by a direct stroke, not by shearing against a fixed plate, thus avoiding the annoyance and clogging caused by lint in such constructions. Herein I have represented it as vibrated by an arm, $r^7$, from the rocking spindle of the gate R, which takes into a slot or aperture, $s$, in its heel, thereby securing perfect unison in the movements of the two. After the band portion of the cord is severed, the end of the spool portion is still kept securely clamped in the holder, and is thus retained until the incipient movement of the clamping-disks, following the next descent of the binding-arm, brings it to the recession $q^7$ and allows it to escape. From the point where it is clamped it runs behind the holder, as shown in Fig. 11, through the throatway, and up to the spool. Were it allowed to rest directly in contact with the lower face of the disk in the space between its end and the throatway it would be at some disadvantage, since it is intended that it shall wedge itself between the holder-plate and disks sufficiently to be held thereby as in a secondary holder when its extreme end is released, but at the same time to pull gradually through with the revolution of the knotter, and if laid in the suggested position will not readily or certainly do so. I therefore arrange upon the offset $o^4$, a little distance out from said throatway, a pin, $o^5$, over which the cord is laid, thus bringing it from its clamping point and directing it into the throatway at an incline. This pin also serves to a considerable extent the same office as the embossment $q^6$ in checking the strand from traveling through the holder in advance of its companion strand next delivered by the binding-arm.

Instead of the pin, it is obvious that a shoulder or guide may be formed upon the flange or offset to serve the same purpose.

As the clamping-disks have but two shoulders, (though this number is in a measure arbitrary,) it is evident that they will be so driven as to make one semi-revolution to each binding operation. This movement takes place, as above intimated, immediately after the binding-arm comes down, and its effect is to carry the cords from the position indicated in Fig. 10 to that in Fig. 11, the knotter acting concurrently with their passage over this space to form the loop and seize the ends, and the cutter acting thereafter to sever the ends thus seized.

The gate R is provided to more effectually stop the cords in position for the action of the knotter. It consists of an arm projecting laterally from a rock-shaft or spindle mounted in the bearing-sleeve $o^2$, and at such height and of such length as to permit it to swing somewhat above the crown of the knotter and to extend partly across the slot in the grain table and come close to the side of the binding-arm when the latter descends. At the outer end it is preferably hooked, so that the cord may not slip off or past it. The gate-shaft has keyed or locked to it at its base a two-armed block, $r\,r'$, the arms being in different horizontal planes, and at the end of each arm is a shoe or anti-friction roll, $r^2$. Upon the front face of the gear and cam wheel I is a cam-track, along which the roll of the arm $r$ travels as the wheel revolves. While the binding-arm is up and moving inward to gather the gavel, and for an interval after its descent, the roll travels on the raised portion R' of the track, and the gate is held out across the slot in the grain-table; but when the knotter has completed or about completed the first half of its revolution the roll descends upon a lower portion, $r^3$, of the track, and the roll upon the arm $r'$, which is the rear roll and hitherto has traveled upon the plane face of the wheel, rides up a slight lug or incline, $r^4$, and thus positively tilts the shaft, causing the gate to give away before the cord sufficiently to render up a little slack to the knotter. The forward roll continues along the trackway $r^3$ until the knotter has finished its revolution, securely grasped the ends of the cord between its jaws, and come to a full stop, when it reaches and descends to a still lower trackway, $r^5$, the rear roll at the same moment surmounting another and more prominent lug, $r^6$, whereby the gate is thrown fully open out of the way of the band-cord to permit the binding-arm, which now starts from its station of rest, to pull the loop from the knotter and eject the bound sheaf from the machine, the cutter operated in this final movement of the gate having already severed the cord from the holder.

For the purpose of bringing the knotter, holder, and gate close up to the gavel, so that the knot may be tied in immediate proximity thereto and a tight band be secured, I cut away or recess the binding-table, as shown in Fig.

9, and so mount them that they project into this recess and come nearly flush with the top of the guards or ribs which border the slot at that point. The recess is covered by a metal cap, $s^2$, which is notched, as at $s^4$, immediately over the point where the gate stops the cord, so that the strands will tend to drop into said notch and be supported thereby above the gate. At the opposite side of the slot or passage-way for the binding arm is a plate, $s^3$, having a vertical flange immediately opposite the recess, for a purpose that will shortly appear.

In binders, generally, the cord in its passage from the spool to the holder runs through an eye in the binding-arm, and is never disconnected therefrom. Such an arrangement may be adopted in my machine; but the arm shown herewith is adapted to engage with the cord only when carrying it about the gavel and to release or deliver it entirely up to the holder after the gavel is encircled, so that when the binding operation is completed and the sheaf ejected the cord from which the next band is to be taken is left stretched directly from the newly-clamped end through the throatway of the holder to the slack take-up or other overhead guide, and thence to its source of supply.

The binding-arm has on the side facing the knotting, holding, and cutting devices flanges or shoulders $t\ t'\ t^2$, laid transversely to its body, but at an inclination to take them readily through the grain. The flange $t$, when the arm is down and at rest, comes just above the path of the knotting-jaws and the flange $t'$ just below, while the flange $t^2$ comes beneath the throatway of the holder. The jaws in their revolution enter the upper of the recesses thus formed and gather the strands of cord from the gavel which have been stopped by the gate at such a point that they are in contact with the crest of the flanges $t\ t'$, and are thus raised out in position to be caught fairly against the inner curved side of said jaws. The point of the holder-plate projects sufficiently to enter the lower recess, thus making a practically closed connection between the binding-arm and the throatway, and the shoulders of the clamping-disks also extend into said recess in their rotation to seize the cord.

The flange $t^2$ is slightly hollowed or rounded out beneath, so that as the binding-arm in its inward movement to gather a gavel comes against the cord leading from the ball or spool to the knotter it may take over it and carry it, as indicated in Figs. 2 and 9, down around the gavel against the gate and to the holder, bringing the upper strand of the bight or bend thus formed, and which is pushed out by the overlying flange $t'$, as above explained, inside the point of the holder plate and into the entrance of the throatway. The knotter now starting to form the loop, the movement of the holder immediately follows and the nearest set of shoulders, $p^2$, of the clamping-disks are brought against the newly-delivered strand, carry it up the throatway alongside the strand previously lying therein and already released as to its extreme end by the incipient action of the holder, and, being pulled through said throatway by the rotation of the knotter, push the two before them until they reach the position shown in Fig. 11, when they are brought to a stop. In this movement the lateral pull upon the cord causes the lower strand of the bight, or that strand now running to the spool, to spring out from beneath the flange $t^2$, catch over the pin $o^5$, and enter the throatway behind the shoulders that are carrying the gavel-strands, where it remains until the next binding operation. When the knotter has completed its revolution to form the knot and has come to a rest with the end strands grasped between its jaws, and these have been severed from the holder by the action of the knife, the binding-arm starts to pull the band therefrom and eject the bound sheaf. It is desirable that at this moment the loop should be pushed off of the surface of the jaws and run down upon the end strands instead of being drawn off by the pull of the band, since under the first condition it will be closed upon the end strands before the stress comes upon them to withdraw them from the knotter and will therefore be tightened by this stress, while under the second it will tend to bind about the jaws and undue force will be required to remove it; hence I mount upon the binding-arm a stripping-finger, $t^4$, which, as the arm moves outward, sweeps the crest of the knotter from heel to point and pushes the loop before it. That this finger may not interfere with the passage of the arm through the stream of grain at the time the gavel is divided off, I arrange it to play longitudinally through the arm and attach it at its rear end to the upper free end of a spring, $t^5$, fast to the side of the arm. This spring is so limited in its outward play and has such strength as to hold the stripping-finger with its point flush with the forward side of the binding-arm or with the crest of the flange $t$, through which it plays while the arm is passing through grain; but as the arm moves along the slot in the grain-table the spring comes against the vertical flange of the plate $s^3$, which, for this purpose, is rounded or beveled at its inner end and stands out into the slot and is pressed against the side of the arm, so as to cause the stripper to project on the other side under the cap $s^2$ and behind the knotter. After the stripper has swept the knotter, the flange drops away suddenly, so that it may be again withdrawn by the spring before the binding arm rises.

The stripper serves also another purpose, for as it is caused to project before the arm comes to a stop it will form an abutment against which the inside strand of the cord about the gavel may rest, and by which it will with certainty be brought up to the gate above the knotter and alongside the outer strand, and thereafter while the knotter revolves the two strands will be held against undue lateral displacement within a sort of closed eye formed by the side of the binding-arm, the cord-gate, stripper, and the edge of the overhead cap.

In order that the cord-gate may hold the cord back upon the knotter and positively prevent the loop from slipping off or escaping before its time, it is preferably brought so low that it nearly touches the crown of the knotter and actually intercepts the path of the stripper. It is evident, therefore, that in the final opening movement of the gate it will be thrown far enough back to allow the point of the stripper to clear it when the binding-arm passes. To prevent the grain from heaping up loosely and irregularly immediately beneath the cord stretched from the spool to the holder, and thereby displacing said cord out of the path of the binding-arm, arms $f'$ are arranged upon the block F, as in Fig. 25, to form an open shield above the stream through which the cord runs, and between which the binding-arm passes as it descends to divide off the gavel. These arms may be permanently attached to the block or, as in the present instance, be removable. They are shown as bent or inclined downward, thereby serving as deflectors as well as a shield, and other parallel arms may be secured to the block to assist in the deflecting function.

In the block, in close proximity to the guide-arms, is formed a socket, $f^2$, to receive the standard of a cord-box or spool-holder, either cord or wire, and a set-screw, $f^3$, is applied in position to clamp the standard fixedly in place when inserted and to allow its ready removal when it is desired to substitute a holder of different construction, as when changing the machine from a cord to a wire binder.

The cord-box U which I use herein is similar to others heretofore used by me; but I have applied to its cover $u$ a tension device of novel construction. A block, U', is set upon the cover so as to project out therefrom and overhang the side of the box. Through this block and cover is an eye or perforation, $u'$, for the passage of the cord from the ball or spool inclosed. Beyond the eye are mounted two plates, $u^3$ $u^4$, bearing cylindrical or conico-cylindrical jaws $w$ $w$, the first plate being pivoted and the second fixed, and the jaws preferably mounted upon spindles, as shown, to turn with the stress of the cord pulled therethrough.

Upon the plate $u^3$, between the eye $u'$ and the jaws, is an arm, $u^2$, extending horizontally over the other plate. A set-screw, $w'$, passes loosely through a lug upon the pivoted plate and takes into a lug on the fixed plate, and around this screw is coiled a spring, $w^2$, so that by taking in or letting out the screw the stress of the spring may be increased or diminished and the jaws brought together with more or less force. The cord is led up through the eye $u'$, slipped sidewise under the end of the arm $u^2$ and between the jaws $w$, then passed through a guide-eye, $w^3$, beyond the jaws, and thence carried to the slack take-up, or otherwise to the holder, as may be required by the exigencies of the machine, and the tension is then adjusted by means of the screw to the proper point.

The binding-arm in this machine is overhung from a front frame-post, and at the rear of the grain-chute and binding-table there is nothing to obstruct the passage of the grain, which, if unusually long, may project out beyond the deck or flooring. The grain-platform is also open at the rear, and the elevator is made with an open rear throatway, having for this purpose its float supported upon the arms $a^3$ $a^4$, overhung from the reel-posts $D^2$ at the front of the machine. I am therefore enabled to make a machine of width corresponding only to the average length of grain, thereby greatly reducing the weight, while at the same time able to carry grain of any length from one end of the machine to the other successively through the raking, elevating, and binding devices until it is discharged in a sheaf upon the ground.

The reel-posts $D^2$ support a reel, T, which is controlled by adjusting-levers T', extending to the rear of the elevator and within reach of the driver in his seat, as shown.

I have described my binding devices as applied to a harvester having an elevated side delivery. It is obvious, however, that they may be applied to harvesters of a different construction or to gleaners, and that certain of the improvements in the binding devices may be used irrespective of the specific form of others.

I do not herein claim, either broadly or specifically, the combination, with a tying-bill which makes a single revolution and stops with its jaws trending outward in the direction of the extended slot through grain-table or covering-shield, of a cord-holder which carries the end strands across the knotter-spindle in opposition to the direction in which it revolves to anticipate the coming around of the tying-jaws, nor the combination, with said elements, of either a cord-stop obstructing the slot inside the tying-bill or a discharge-arm which forces the bound sheaf from the table sidewise to strip and pull off the knot, nor the combination of all four of the above-mentioned elements conjointly, having made such the subject of an application filed on the 4th day of April, 1887, as Division B of this present application, Serial No. 233,546; but What I do claim, and desire to secure by Letters Patent herein, is—

1. In a grain-binder, the combination, with the binding-arm moving orbitally to collect and compact the gavel and to eject it, and with the grain-receptacle, of an elastically-yielding outside compressor playing longitudinally up and down through the binding-slot in the flooring of said receptacle to meet and compress the gavel and to allow the discharge of the bound sheaf.

2. In a grain-binder, the combination of an arm or block pivoted to the frame-work and lying beneath the grain-receptacle and having an irregular groove or cam-track in its side, a compressor jointed to the free end of said arm, a wrist-pin from a rotating shaft taking into said cam-track, and a retaining device whereby the compressor is moved into position for action and retained therein while the gavel is being compressed and then withdrawn to permit its discharge.

3. In a grain-binder, the combination, with a compressor, of an arm or block to which it is jointed by a spring-pivot, means for moving said arm to bring the compressor into position for action, and a catch or lock which takes upon said arm and holds it against retreat until the gavel has been compressed.

4. In a grain-binder, the combination of an arm or block pivoted to the frame-work and having an irregular groove or cam-track in its side, a compressor jointed to the free end of said arm, a wrist-pin from a rotating shaft taking into said cam-track to move the compressor to and from its position of action, and a catch or lock which retains the arm at rest while the gavel is being packed against the compressor and is then tripped by the wrist-pin in its continued movement to release the arm and allow the compressor to be withdrawn.

5. In a grain-binder, the combination of an arm or block pivoted beneath the binding-table and having an irregular groove or cam-track in its side, a compressor jointed to the free end of said arm by a spring-pivot and playing through the binding-slot in the grain-table, and a wrist-pin from a rotating shaft taking into the cam-track to move the compressor to and from its position of action.

6. In a grain-binder, the combination of an arm or block pivoted beneath the binding-table and having an irregular groove or cam-track in its side, a compressor jointed to the free end of said arm by a spring-pivot and playing through the binding-slot in the grain-table, a wrist-pin from a rotating shaft taking into a portion of the cam-track to move the compressor into position for action, and a latch which catches over the block and holds it in its elevated position until tripped by the wrist-pin as it comes around into another portion of the track to force the compressor down.

7. In a grain-binder, the combination of an arm or block pivoted beneath the binding-table and having an irregular groove or cam-track in its side, a spring upon the pivot to cause a sudden initial rise of the arm, a compressor jointed to the free end of said arm and playing upward through the grain-table, and a wrist-pin from a rotating shaft taking into a portion of the cam-track to supplement the spring and positively raise the compressor into position for action.

8. In a grain-binder, the combination of an arm or block pivoted beneath the binding-table and having an irregular groove or cam-track in its side, a spring upon the pivot to cause a sudden initial rise of the arm, a compressor jointed to the free end of said arm and playing upward through the grain-table, a wrist-pin from a rotating shaft taking into a portion of the cam-track to supplement the action of the spring and positively raise the compressor into position for action, and a latch which catches over the arm when raised and locks it against descent until tripped in the subsequent movements of the machine.

9. In a grain-binder, the combination of an arm or block pivoted beneath the binding-table and having an irregular groove or cam-track in its side, a spring upon the pivot to cause a sudden initial rise of the arm, a compressor jointed to the free end of said arm by a spring-pivot and playing through the binding-slot in the grain-table, and a wrist-pin from a rotating shaft taking into a portion of the cam-track to supplement the action of the first-named spring and raise the compressor positively into position for action.

10. In a grain-binder, the combination of an arm or block pivoted beneath the binding-table and having an irregular groove or cam-track in its side, a spring upon the pivot to cause a sudden initial rise of the arm, a compressor jointed to the free end of said arm by a spring-pivot and playing through the binding-slot in the grain-table, a wrist-pin from a rotating shaft taking into a portion of the cam-track to supplement the action of the first-named spring and raise the compressor positively into position for action, and a latch which catches over the arm when raised and locks it against descent until tripped in the subsequent movements of the machine.

11. In a grain-binder, the combination of an arm or block pivoted to the frame-work and having an irregular groove or cam-track in its side, a spring upon the pivot to cause a sudden initial movement of the arm, means for adjusting the stress of said spring, a compressor pivoted to the free end of the arm, and a wrist-pin on a rotating shaft taking into a portion of the cam-track to supplement the action of the first-named spring and positively move the compressor into position for action and into another portion of the track to overcome the stress of the spring and positively withdraw the compressor.

12. The combination of the pivoted block or plate M', having the camway $m'$ $m^5$ $m^6$, the compressor N, pivoted to its free end, the wrist-pin $h^6$, taking into said camway, and the latch $m^3$, substantially as described.

13. The combination of the pivoted block or plate M', having the camway $m'$ $m^5$ $m^6$, the compressor N, pivoted to its free end, the wrist-pin $h^6$, taking into said camway, the latch $m^3$, catching over the block when raised, and the stop $m^2$ on the supporting frame or bracket to insure the engagement of said latch.

14. The cam-plate formed, as described, with the cam-tracks $m'$, $m^5$, and $m^6$, for the purpose set forth.

15. The adjustable spring-pivot for the cam-block or compressor-arm, composed of the pivot-pin, the spring coiled thereabout and attached at one end to the block or arm, the radially-grooved collar or cap receiving the other end of the spring, and the key passing through the pivot-pin and taking into any of said grooves.

16. In a grain-binder, the combination of an outside compressor which moves up from beneath the binding-table to meet and stop the gavel, and a divider-arm, which also moves up from beneath the table as the compressor-arm is being withdrawn and descends as the compressor-arm again rises.

17. In a grain-binder, the combination of a compressor-arm mounted upon and moved by a cam-block and a divider-arm mounted upon and actuated by the wrist-pin of a rotating crank, which wrist-pin also takes into the cam-block to cause its movements.

18. The combination of the compressor and divider arms, the cam-block M', and the wrist-pin $h^6$, substantially as described.

19. The combination of the compressor, the cam block or plate upon which it is mounted, the wrist-pin taking into the camway in said plate to actuate it, the cranked shaft upon which said wrist-pin is mounted, and the single gear and cam wheel driving said shaft, and also the band securing devices and binding-arm.

20. The combination of the compressor, the dividing or separating arm, the cam-plate upon which the compressor is mounted, the wrist-pin taking into the cam-plate to actuate it, and also supporting and actuating the dividing-arm, the cranked shaft upon which said wrist-pin is mounted, and the single gear and cam wheel driving said shaft, together with the band-securing devices and binding-arm.

21. In combination with automatic binding mechanism, change-speed gear intermediate between it and the harvester and controllable by the driver to vary the regular speed of the machine, and an independent clutch also controllable by the driver, whereby the change-speed gear may be instantly thrown out of action without altering their adjustment to meet an emergency or size the gavels at will.

22. In combination with automatic binding mechanism, change-speed gear intermediate between it and the harvester and controllable by the driver, a clutch by which the driving-sections of said gear are locked to their shaft, and a means whereby the driver can instantly throw said clutch out of engagement to meet an emergency or size the gavels at will.

23. In combination with automatic binding mechanism, change-speed gear intermediate between it and the harvester, a lever whereby it may be set by the driver to vary the regular speed of the machine, a clutch by which the driving-sections of said gear are locked to their shaft, and a treadle under the driver's foot, whereby he may instantly disengage said clutch without altering the adjustment of the speed-gear to meet an emergency or size the gavels at will.

24. The change-speed gear having clutch-hubs, combined with a dog adapted to engage with said hubs, a lever to shift the dog from one hub to another, and a segment into which the lever locks, having its teeth so arranged relatively to the hubs as to insure the engagement of the dog.

25. The change speed gear having clutch-hubs, combined with a dog adapted to engage with said hubs, a lever to shift the dog from one hub to another, and a segment into which the lever locks, having its teeth so arranged relatively to the hubs as to insure the engagement or non-engagement of the dog with the hubs.

26. The combination of the change-speed gear, the sliding block, and a dog pivoted thereon and pressed down by an independent spring to engage with said hubs.

27. The combination of an elevator-float or grain-guard overhung from one side of the harvester and a binding-arm overhung from the same side of the binding attachment, whereby a clear throatway is left for projecting grain at one side of the machine until its exit as a bound sheaf.

28. In combination with an overhung float or grain-guard and an overhung binding-arm, an overhung support on the harvester for the upper brace-rods of the binding attachment.

29. In combination with an overhung float or grain-guard and an overhung binding-arm, an overhung support and trackway on the harvester for the traveler-block which receives the upper brace-rods of the adjustable binding attachment.

30. A cord-holder arranged and adapted, substantially as described, to take a second and feebler grasp upon the body of the spool-strand between the knotter and the point where the end is primarily held in said holder and concurrently while it is so held, whereby the strand will be yieldingly held for the action of the knotter after the end is released.

31. In a cord-holder, a holder-plate formed with a rib or embossment slightly in rear of the point where the cord enters the holder to check the first strand until the second is brought alongside, combined with coacting mechanism, whereby said strands are clamped against the plate and ultimately moved therealong and forced past the embossment.

32. In a cord-holder, a holder-plate extended out at its point to enter a recess in the side of the binding-arm and thereby form a continuous throatway for the reception of the cord therefrom.

33. In a cord-holder, a holder-plate extended out at its point to enter a recess in the side of the binding-arm and form a continuous throatway, combined with revolving clamping-disks having shoulders which also enter said recess in their movement to sweep the cord up said throatway.

34. The combination, in a cord-holder, of the shouldered revolving disks, the holder-plate lying between them, and the rib or embossment upon the holder-plate to check the first strand of cord until the second is brought alongside by the positive action of the disks.

35. The combination, in a cord-holder, of the shouldered revolving disks, the holder-plate lying between them, and the eccentric stripping-plate encircling their axis beneath the holder-plate.

36. The combination, in a cord-holder, of the revolving clamping-disks, the holder-plate lying between them, shoulders upon said disks, and secondary shoulders in rear of these primary shoulders and between them and the knotter.

37. The combination, in a cord-holder, of the revolving shouldered clamping-disks and the holding-plate lying between them, having a rib or embossment near the point where the cord is received to check the first strand and cut away opposite to the embossment to release the end of said strand.

38. The combination, in a cord-holder, of the revolving shouldered clamping-disks, the holder-plate lying between them, and a pin or abutment beneath them over which the spool-strand of the cord is bent between its clamped end and the throatway of the holder.

39. The clamping-disks separated by a washer and bound together by screws passing through them and the washer, whereby they may be adjusted apart from each other by the insertion of their re-enforcing washers.

40. The combination of the holder-pinion, the disk seated against its base, the washer seated on said disk, and a second disk seated upon said washer, the whole being bound together by screws passing through the disks and washer and into the pinion.

41. The combination of the holder-pinion having a steady-pin projecting from its base, the disks perforated to match the spindle-hole in said pinion and to take over said steady-pin, the washer, likewise perforated and lying between them and the screws which bind the whole together.

42. The combination of the holder-pinion formed with projecting fingers or shoulders and the clamping-disks fast thereto and having shoulders slightly in advance of those upon the pinion.

43. The combination of the knotter, a cord-holder which retains the ends of the band-cord during the knotting operation, shoulders supporting the cord between the knotter and the holder, and a knife which severs the cord stretched between the holder and said shoulders by a direct stroke.

44. The combination, in a cord-holder, of the revolving clamping-disks, the holder-plate lying between them, shoulders upon said disks, secondary shoulders set apart from these primary shoulders between them and the knotter, and a knife which severs the cord stretched between said shoulders by a direct stroke.

45. The combination of the shouldered pinion, the shouldered clamping-disks, the holding-plate, and the knife which severs the cord between the shoulders of the disk and of the pinion.

46. The pivoted knife operated by a projection from the rock-shaft of the cord-gate, substantially as described.

47. The vibrating cord-gate overlying the knotter, combined with means whereby it is swung out across the slot in the grain-table to stop the strands of cord as the binding-arm comes down and swung back at the conclusion of the knotting operation to leave the slot clear.

48. The vibrating cord-gate overlying the knotter, combined with means whereby it is first swung across the slot in the grain-table to stop the gavel-strands of the cord as the binding-arm comes down, then caused to slightly recede to give up slack in the knotting operation, and finally opened entirely away to leave the slot clear.

49. The combination of the vibrating cord-gate and a cam upon the face of the single gear and cam wheel which drives the band-securing mechanism, whereby its movements are imparted.

50. The combination of the cord-gate, the rock shaft upon which it is mounted, the diverging arms at the foot of said rock-shaft, and the cams upon the face of the driven wheel, acting upon shoes or rolls upon said arms to impart movements to the gate.

51. The gear and cam wheel formed with a rack and delay-surface on one side to drive the knotter and a cam track on the other side to move the cord-gate.

52. The gear and cam wheel having on one side concentric racks, delay-surface, and cam, whereby either a knotter or a twister may be driven, and on the other a cam-track to operate a gate to stop the gavel ends of the band material.

53. The combination, with the cord-gate, of an arm or finger which carries the gavel-strands thereagainst and restrains them from retreat during the operation of the knotter.

54. The combination, with the cord-gate and knotter, of a stripper which pushes the loop from the knotter as the gate is thrown open.

55. The combination, with the tying-bill, of a cord-gate playing over its crown and a stripper which sweeps said crown as the gate is thrown open to push the loop off upon the ends of the band held between the jaws of the bill.

56. The combination, with the tying-bill, of a stripper projecting from the side of the binding-arm in such position as to sweep the crown of the bill as the binding-arm moves past it.

57. The stripper playing through the side of the binding-arm and retracted by a spring, as described, to allow it to pass through the grain in the descent of the arm.

58. A finger playing through the side of the binding-arm and retracted by a spring, as described, combined with a cam-flange projecting at the side of the slot in the grain-table, whereby it is pushed out as it nears the band-securing mechanism to support the band material and bring it into position.

59. The stripper playing through the side of the binding-arm and retracted by a spring, as described, combined with a cam-flange projecting at the side of the slot in the grain-table, whereby it is pushed out as it nears the knotter and until it has passed it.

60. The combination of the knotter, the stripper, the cord-gate, and the overlying cap, as and for the purpose described.

61. The binding-arm formed with the lateral flanges $t\ t'$, to pass above and below the knotter or twister, and with the lateral flange $t^2$, to pass below the holder, as and for the purpose set forth.

62. The binding-arm formed with an inclined lateral flange, $t^3$, rounded out or cupped beneath to take over the cord stretched between the spool and the holder as the arm moves inward and downward to divide off the gavel.

63. The binding-arm formed with a lateral undercupped flange by which the cord is carried down, combined with a holder which removes the cord therefrom by a lateral pull.

64. The binding-arm formed with a lateral undercupped flange, as set forth, combined with a holder-plate, the point of which comes above said flange when the arm is down to form a continuous throatway, and shouldered stamping-disks which seize the cord in said throatway as they revolve and carry it away sidewise.

65. The combination, with the binding-arm, of the cord-gate arranged to come close against the side of said arm when swung out across the slot in the binding-table.

66. The combination of the binding-arm, its stripper, and the cord-gate, substantially as described.

67. The tension device having the conico-cylindrical jaws, as described.

68. The combination of the fixed and pivoted plates, the spindles carried at their free ends, and the conico-cylindrical jaws mounted upon said spindles so as to turn with the stress of the cord.

69. The tension device consisting of the fixed and pivoted plates, the finger upon one of said plates under which the cord may be slipped, and the upright jaws beyond said finger.

70. The combination of the pivoted plate $w^3$, having finger $w^2$, the fixed plate $w^4$, the jaws $w$ on said plates, the thumb-screw $w'$, and the spring $w^2$, to form a tension device, as set forth.

71. The plates $w^3$ and $w^4$, with their finger, jaws, and adjusting-screw, mounted upon the cap of the cord-box in the described relation to the aperture for the cord.

72. The combination of the adjustable binder-frame, the screw-rod threaded into a bracket or hanger on said frame, a yoke on said rod, a socket on the harvester-frame, into which said yoke latches, and a key or other fastening to secure it in said socket.

73. The combination of the screw-rod $e^5$, having crank $e^6$, the yoke or latch $e^7$ thereon, the socket $a^5$ upon the harvester-frame, and the key $a^6$, to secure the yoke in said socket.

74. The brace-rod connected at one end with the binder-frame near to the axis of its main gear-wheel and at the other yoked or sleeved upon the hub of the intermeshing sliding pinion on the counter-shaft of the harvester.

75. The brace-rod hooked at one end into an eye on the binder-frame and at the other yoked or sleeved upon the hub of the intermeshing sliding pinion on the counter-shaft of the harvester.

76. The brace-rod between the main shaft of the binder and the counter-shaft on the harvester, combined with means whereby it may be shortened or lengthened, for the purpose set forth.

77. The hooked brace-rod formed in two sections, one of which is sleeved upon the sliding pinion of the harvester and the other threaded into the former, as set forth.

78. The combination of the main wheel of the harvester, the shaft $b$, driven thereby, a gear-wheel thereon, the crank-shaft $b'$, and its pinion meshing with an outer annular rack upon the said gear-wheel, and the shaft $b^2$, driving the rake-wheel and binding attachment, with its pinion meshing into an inner annular rack upon said gear, as set forth.

79. The combination of the adjustable seat, the pedal or treadle upon its foot-rest, the adjustable link connecting said pedal with the clutch-lever pivoted upon the harvester-frame, and the adjustable brace-rod connecting the seat-standard with said frame.

SYLVANUS D. LOCKE.

Witnesses:
   CHAS. Q. ELDREDGE,
   JOHN W. TIFFT.